No. 884,695. PATENTED APR. 14, 1908.
J. WHITE.
TWO WHEELED CART.
APPLICATION FILED JUNE 23, 1906.
3 SHEETS—SHEET 1.
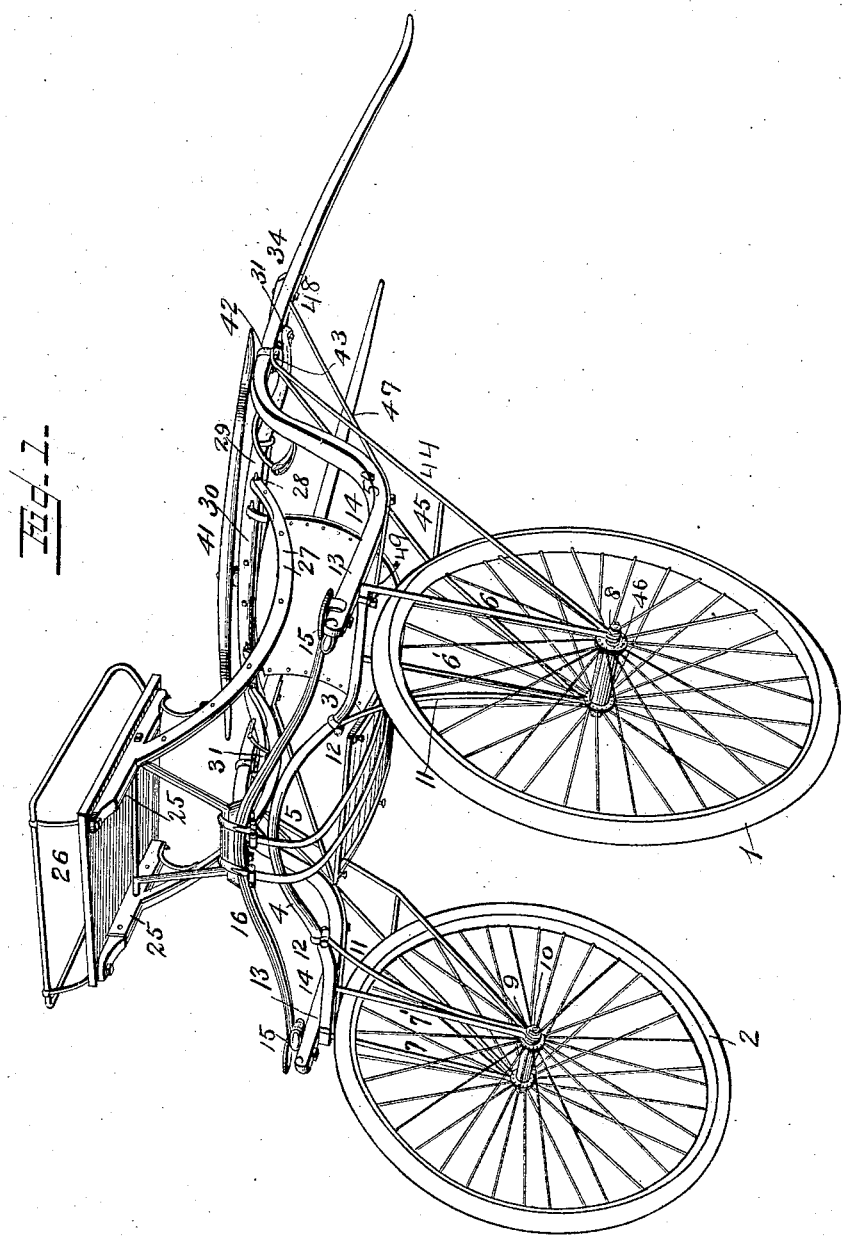
Witnesses
W. R. Ourand.
J. L. Ourand
Inventor
James White.
by W. H. Singleton,
Attorney No. 884,695. PATENTED APR. 14, 1908.
J. WHITE.
TWO WHEELED CART.
APPLICATION FILED JUNE 23, 1906.
3 SHEETS—SHEET 2.
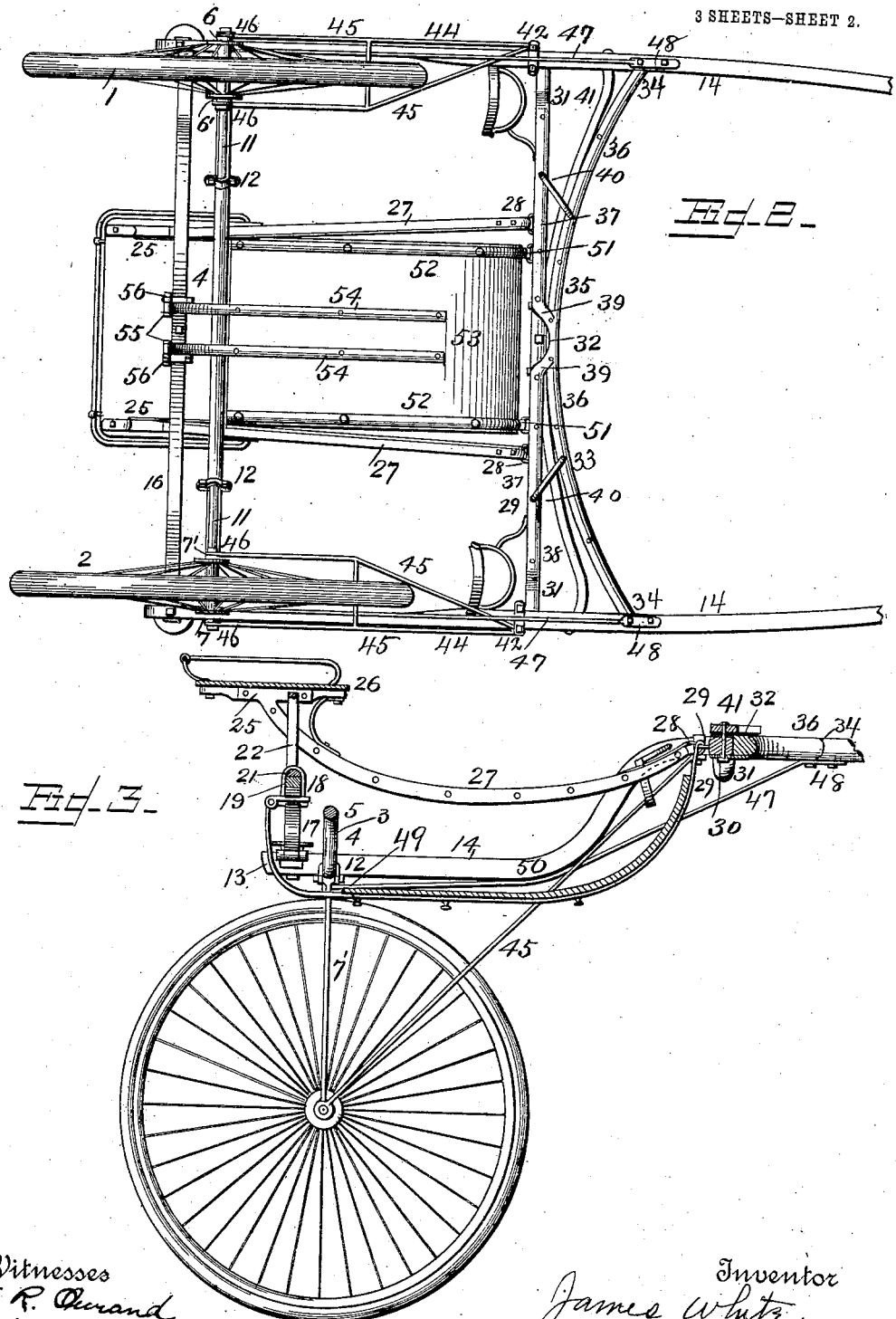

No. 884,695. PATENTED APR. 14, 1908.
J. WHITE.
TWO WHEELED CART.
APPLICATION FILED JUNE 23, 1906.
3 SHEETS—SHEET 3.
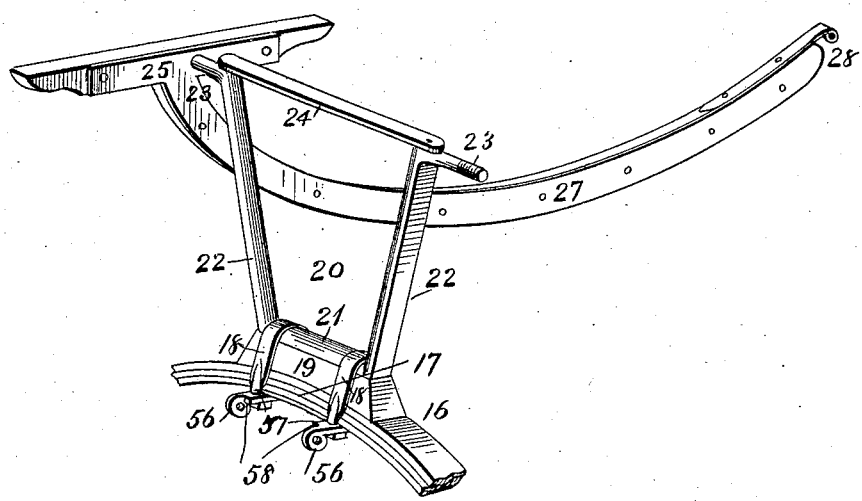
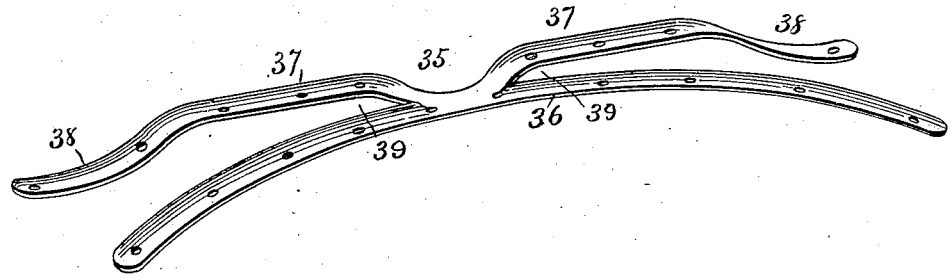
Witnesses
W. R. Ourand
J. L. Ourand
Inventor
James White,
per W. H. Singleton,
Attorney

UNITED STATES PATENT OFFICE.

JAMES WHITE, OF PENN YAN, NEW YORK.

TWO-WHEELED CART.

No. 884,695.　　　　Specification of Letters Patent.　　Patented April 14, 1908.

Application filed June 23, 1906. Serial No. 323,078.

*To all whom it may concern:*

Be it known that I, JAMES WHITE, a citizen of the United States, residing at Penn Yan, in the county of Yates and State of New York, have invented certain new and useful Improvements in Speeding-Carts or Two-Wheel Carts, of which the following is a specification.

This invention relates to new and useful improvements in "two wheel carts" or "speeding carts."

The object of the invention is to provide a cart which shall be firm in all its parts being well braced, and so constructed that in case of collision in speeding wheels will not strike.

The invention consists in the construction hereinafter pointed out.

In the annexed drawings: Figure 1 represents a perspective view of a two wheel cart provided with the invention. Fig. 2, a bottom plan view. Fig. 3, a vertical longitudinal section. Fig. 4, an enlarged detail perspective view. Fig. 5, a perspective view of the cross-bar brace.

In these drawings: the numerals 1 and 2 represent the usual bicycle wheels now commonly used on a "speeding cart." They are journaled in the frame 3. This frame 3 consists of the axle 4 having the middle upturned arch 5, and at the ends of the axle the downwardly extending substantially parallel pair of standards 6 6' and 7 7' made integral with the axle 4, one standard of each pair being at the extremity of the axle. The wheels 1 and 2 are journaled in bearings 8 and 9 of the standards 6 6' and 7 7'. The inner ends of the hubs of these wheels 1, 2 are also journaled in bearings 10, 10 at the lower ends of braces 11, 11, which are held to the axle 4 by clips 12, 12.

Secured on top of the extremities of the axle 4 just above the outer standards 6 and 7 are the rear ends 13, 13 of the downwardly curved shafts 14, 14. Linked to these ends 13, 13 behind the axle 4 are the ends 15, 15 of the cross seat supporting spring 16. At the middle 17 of the spring 16 there is held by clips 18, 18 a spring block 19, to the top of which by the clips 18, 18 there is secured the seat supporting frame 20. This frame consists of the bottom piece 21, the side pieces 22, 22 from which at the top extend laterally the projections 23, 23 and the top piece or brace 24, the whole forming an integral frame. The projections 23, 23 engage the seat bearers 25, 25, to which the seat 26 is fastened. These bearers are carried at the rear ends of the arms 27, 27, the front ends 28, 28 of which are hinged to the cross-bar 29. This cross-bar 29 has a raised portion 30, the top of which is in the plane of the tops of the shafts 14, 14, and its ends 31, 31 are curved downward and secured to the under sides of the shafts 14, 14. To the front of the middle of the raised portion 30 there is secured the middle 32 of the curved cross-bar 33, the ends 34, 34 of which are secured to the shafts 14, 14. Fastened to the upper sides of the cross-bars 29 and 33 is the integral brace 35. This consists of a curved member 36 adapted to and fitting the cross-bar 33, and two substantially straight members 37, 37 in line with each other, having the curved ends 38, 38, and adapted to and fitting the cross-brace 29. These members 37, 37 are connected to the curved member 36 by the oblique connections 39, 39. This brace 36 is fastened lengthwise to the under surfaces of the cross-bars 29 and 33 and extending from shaft to shaft. The location of the connections 39, 39 is such that they come on each side of the middle of the two cross-bars and at the angles formed by the meeting middles of these cross-bars. To further strengthen these several parts brace rods 40, 40 may extend from cross-bar 29 to cross-bar 33.

To the cross-bar 29 is swiveled the whiffletree 41. By clips 42 there are secured to the shafts 14, 14 just back of the ends 31, 31 of the cross-bar 29, the front ends 43, 43 of downwardly and rearwardly extending braces 44, 44, the sides 45, 45 of which are upon opposite sides of each wheel 1 and 2 and the lower ends 46, 46 of which are around the ends of the journals of the wheels 1 and 2 at the lower ends of the standards 6, 6' and 7, 7'.

To the under sides of the shafts 14, 14 are secured braces 47, 47, the front ends 48, 48 of which are fastened to the shafts at or near the ends 34, 34 of the curved cross-bar 33, the rear ends 49, 49 are connected to the axle 4 and in between these braces 47, 47 are fastened to the curves 50, 50 of the shafts 14, 14.

Linked to the rear of the cross-bar 29 between the front ends of the arms 27, 27 are the front ends 51, 51 of the side straps 52, 52 of the foot rest 53. The rear foot rest supporting straps 54, 54 have their outer ends 55, 55 secured to ears 56, 56. These ears 56, 56 are made integral with the clip plates 57, 57 of the clips 18, 18.

The construction described provides a speeding cart with a frame so arranged that in case of collision the wheels are protected from impact and the frame is so firmly braced that it will resist the shock and the several parts are not liable to be separated.

The connection between the shafts in front of the seat hold them securely from twist or wrenching strain. The position of the lengthwise braces connected at the ends of the cross-bars and to the shafts and axle form with these a well braced frame, so that any shock is not taken by any special part of the cart, but is transformed from one part to another and they all combine to resist the shock and prevent strain upon or separation of the several parts.

Having described my invention, what I claim is:

1. In a two wheeled cart, the combination of the axle 4 having the standards 6, 6' and 7, 7'; the shafts 14, 14 secured to the axle 4; the cross-bars 29 and 33 secured to the shafts 14, 14; the brace 35 secured on the cross-bars 29 and 33; with the braces 44, 44 secured to the shafts near the ends of the cross-bar 29 and at the lower ends of the standards 6, 6' and 7, 7'; and the braces 47, 47 secured to the shafts 14, 14 near the ends of the cross-bar 33 and to the axle 4.

2. The combination of the two shaft cross-bars of a vehicle with an integral brace consisting of one member secured to one cross-bar and two members secured to the other cross-bar.

3. The combination of the cross-bars 29 and 33 secured together with the integral brace 35 consisting of the members 36 and 37, 37, and the connections 39, 39 between the member 36 and members 37, 37.

4. The combination of the cross-bars 29 and 33 secured together at their middles, and the integral brace 35 consisting of the members 36 and 37, 37, and the connections 39, 39 with the brace rods 40, 40, the brace 35 being fastened to the cross-bars 29 and 33 and the rods extending from one cross-bar to the other.

In testimony whereof I have signed my name to this specification in the presence of two subscribing witnesses.

JAMES WHITE.

Witnesses:
H. C. EARLES,
M. A. RUDY.